United States Patent Office 3,378,138
Patented Apr. 16, 1968

3,378,138
AUTOMATIC CONTAINER CHECKER
AND EJECTOR APPARATUS
Gaylord W. Brown, Beaverton, Mich., assignor to Brown
Machine Company of Michigan, Inc., Beaverton, Mich.,
a corporation of Michigan
Filed Apr. 27, 1965, Ser. No. 451,220
11 Claims. (Cl. 209—72)

ABSTRACT OF THE DISCLOSURE

An apparatus and method for checking plastic containers for neck obstructions and the like wherein a tubular detector enters the neck of a container which is initially prevented by a barrier from moving in one endwise direction and a fluid stream is passed through the detector to discharge the container in an endwise direction when an obstruction is detected and the barrier is in removed position.

Figure 1:
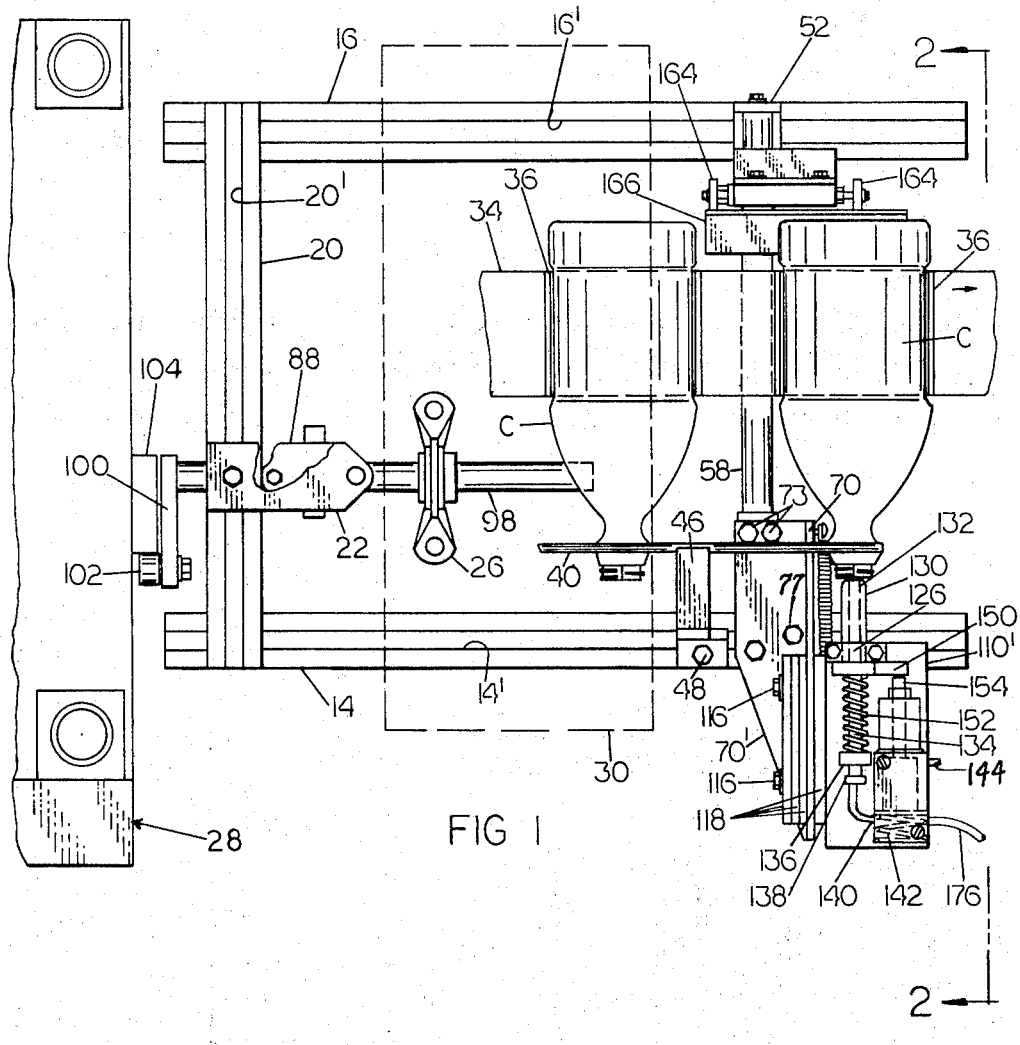

The present invention relates to automatic container checker and ejector apparatus, and more particularly to apparatus which may serve as an attachment to a finishing machine which is adapted to deflash and to trim or face the top edges or necks of plastic containers or jars and the like.

The present invention may be utilized, for example, with a finishing machine as shown in applicant's assignee's United States patent application Ser. No. 275,159, filed Apr. 23, 1963, now Patent No. 3,228,086, which discloses a finishing machine including conveyor means for conveying plastic containers or the like through the apparatus, wherein dies are provided for removing flashing from the containers, and wherein a deburring tool is movably mounted for engagement with the mouth portion of the containers. This apparatus may be of a type wherein the conveyor belt is periodically indexed and wherein the deflashing and deburring operations are carried out while the conveyor is at rest.

The automatic container checker and ejector apparatus of the present invention can be utilized with this type of apparatus and could, for example, be mounted on the same frame as the deflashing and deburring structure and would, for example, be mounted downstream of the deburring cutter, the automatic container checker and ejector apparatus also operating while the conveyor means pauses between movements. It will be understood that with this arrangement the deflashing, deburring and checking and ejecting operations can be carried out simultaneously on different containers.

The purpose of the present invention is to check whether the internal neck portion of a plastic container or the like is free and unobstructed, or whether there are obstructing portions which may bridge across the neck of the container during the molding process, thereby providing a portion which would prevent the container from being properly filled with a substance such as bleach or the like.

Accordingly, the present invention incorporates detecting means which is adapted to be inserted within the open end of the container to detect the presence of any obstructing portions which may be inadvertently formed during the molding process.

In addition, the apparatus of the present invention provides means for automatically ejecting any containers which are obstructed, and conversely, if the containers are free of obstructions, they are allowed to pass downstream of the checker and ejector apparatus to be accepted for use.

The detecting means not only serves in the present invention to detect the presence of undesired obstructions, but also incorporates fluid pressure means whereby a fluid under pressure, such as air, can be forced through the open end of the associated container into the interior thereof. This action assists in ejecting the container since the container is thereby forced away from the detecting means and away from the supporting portions of the machine.

In addition, supplemental ejecting means is provided in the form of a pivotally mounted barrier member engaging the opposite closed end of the container. This pivotally mounted member is adapted to operate substantially simultaneously with the issuance of a jet of fluid under pressure from the detecting means so that an associated container is very forcibly ejected from the apparatus.

The arrangement of the present invention is such that the detecting operation and the ejecting operation can be carried out in a rapid and efficient manner so that a rapidly operating apparatus is provided for use in a fabrication line in accordance with mass production techniques.

An object of the present invention is to provide new and novel automatic container checker and ejector apparatus which is particularly adapted for detecting the presence of obstructing portions in the neck of a container formed of plastic.

Another object of the invention is the provision of automatic container checker and ejector apparatus including means for automatically ejecting a container in a rapid and efficient manner if the presence of undesired obstructions is detected.

Still another object of the invention is to provide automatic container checker and ejector apparatus which is adapted to be employed with an indexing type machine in a fabrication line.

Yet another object of the invention is the provision of automatic container checker and ejector apparatus which is quite simple and inexpensive in construction, and yet which is efficient, fast-acting and reliable in operation.

Figure 2:
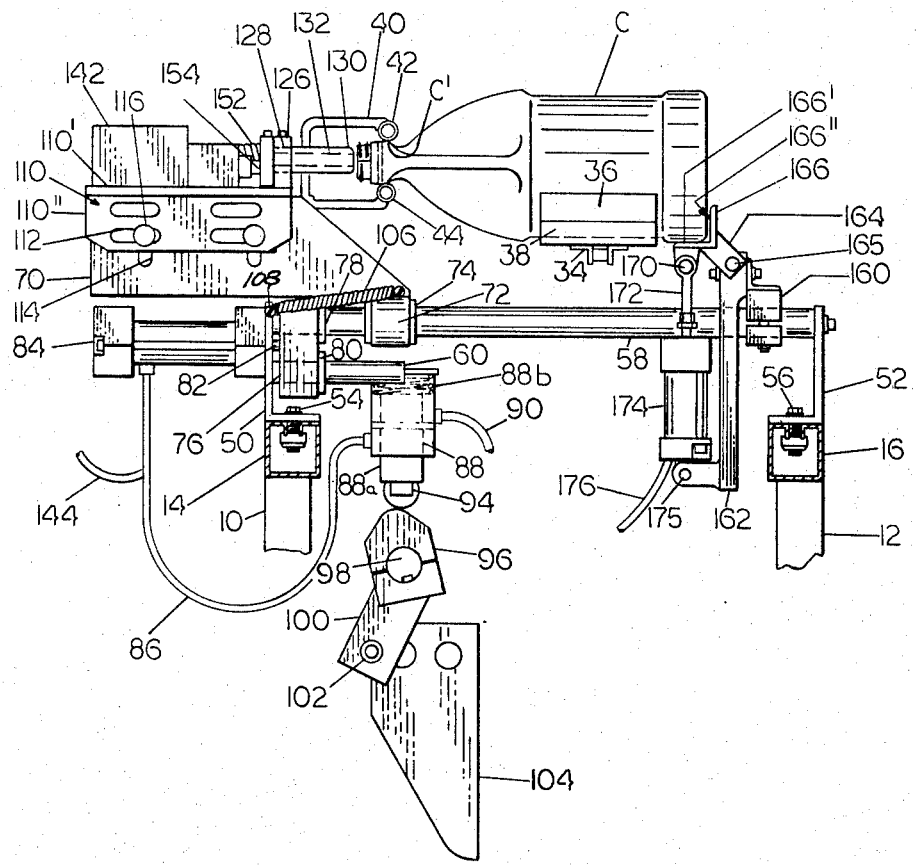

Other objects and many attendant advantages of the invention will become more apparent when considered in connection with the specification and accompanying drawings, wherein:

FIGURE 1 is a top view of the apparatus of the present invention illustrated in its mounted operative position upon the frame of an associated machine; and FIGURE 2 is a view taken substantially along line 2—2 of FIGURE 1 looking in the direction of the arrows.

Referring now to the drawings, wherein like reference characters designate corresponding parts throughout the several views, a pair of upstanding frame members 10 and 12 are illustrated, channel members 14 and 16 being secured to these upstanding frame members and defining upwardly facing centrally extending recesses 14' and 16' respectively which permits adjustment of associated members throughout the length thereof.

A cross channel member 20 also includes an upwardly facing, longitudinally extending recess 20', and a support member 22 is fixedly mounted in the position shown in FIGURE 1 by means of a nut and bolt assembly indicated by reference numeral 24. A suitable bearing assembly is indicated by reference numeral 26 and is supported upon associated portions of the machine (not shown). The purpose of portions 22 and 26 will be described hereinafter.

The deflashing die means are mounted on suitable platens, and one such platen is indicated by reference numeral 28 in FIGURE 1. Accordingly, the deflashing station of the machine is at the left-hand portion of FIGURE 1, the deflashing operation being carried out by the dies on the platens. A facing station is indicated schematically by phantom line 30, and it should be understood that at this point the deburring or facing structure would be mounted, such structure having been removed in the drawings for the sake of clarity in describing the apparatus of the present invention.

The means for moving the containers from station to station comprises an endless chain conveyor 34 having fixed thereto at uniformly spaced intervals saddle members 36 which are adapted to convey and support the containers indicated by reference character C in the direction as indicated by the arrow in FIGURE 1. The saddles 36 are mounted on members 38 which are attached to the links of the chain 34 as seen in FIGURE 2. The chain conveyor may be trained around suitable driven sprockets and further may be supported at intermediate points as required. Any suitable drive mechanism may be connected with the chain conveyor so as to index the chain conveyor from station to station as required.

Guide means indicated generally by reference numeral 40 is provided, this guide means being suitably supported by the frame of the machine and, as seen in FIGURE 2, being generally U-shaped in cross section and including two tubular portions 42 and 44 which are adapted to engage at diametrically opposite sides of the rib portion C' extending peripherally about the neck part of the container. It is apparent that as the conveyor means moves the containers in the direction indicated by the arrow in FIGURE 1, the guide means 40 will serve to additionally support the containers and to assure proper alignment of the containers as they pass through the facing stations and the checking and ejecting stations of the apparatus. The guide means terminates just beyond the checking and ejecting stations such that, after the containers have been checked, accepted containers will become disengaged from the guide means and pass outwardly through the open end thereof as they are moved further to the right by the conveyor means. Containers having obstructions are ejected transversely in a manner which will be described. As seen particularly in FIGURE 1, the guide means 40 may be supported in the operative position shown by support means 46 which in turn is mounted on member 14 and secured thereto by nut and bolt assembly indicated by reference numeral 48.

Referring now particularly to FIGURE 2, a pair of angle support members 50 and 52 are provided, these angle support members being supported by and fixed in place upon members 14 and 16 respectively by nut and bolt assemblies indicated generally by reference numerals 54 and 56. A guide rod 58 is supported between the upper portions of members 50 and 52, and a further guide rod 60 is supported by support member 50, these guide rods serving a purpose hereinafter described.

The reciprocating means which is adapted to reciprocate the detecting member includes a slidable member 70 including a lower generally horizontally extending leg portion 70' and an upwardly generally vertically extending leg portion 70". A reciprocal portion 72 which may comprise a separate member is secured to leg portion 70' by means of nut and bolt assemblies 73 and extends downwardly from the leg portion and has a slide bearing 74 mounted therewithin which slidably receives guide rod 58. Another slidable portion 76 which may also comprise a separate member is secured to leg portion 70' by means of nut and bolt assemblies 77 and extends downwardly from the leg portion in spaced relationship to portion 72, portion 76 having slide bearings 78 and 80 mounted therewithin which slidably receive guide rods 58 and 60 respectively. The interengagement between the various slide bearings and the guide rods ensure that slidable member 70 will have the proper linear travel in its reciprocatory movement.

Downwardly extending portion 76 of the slidable member 70 is operatively connected with a piston rod 82 which in turn is connected with a suitable piston reciprocably mounted within a single-acting air cylinder 84 or similar power actuated means. Cylinder 84 is connected with conduit 86 which in turn is operatively connected with a valve means 88. This valve means is in turn connected with a conduit 90 which may be connected with a suitable source of fluid pressure. Valve means 88 is supported from the support structure 22 previously described.

The valve means includes a follower 94 adapted to actuate the valve means, this follower engaging a valve cam 96 secured to a shaft 98 which is rotatably supported within the bearing means 26 previously described. A depending member 100 is also secured to shaft 98, and a follower means 102 is supported by the lower end of member 100. This follower means is adapted to cooperate with a cam block 104 secured to the platen 28 previously described. With this arrangement, valve means 88 and accordingly the reciprocation of the reciprocating means carrying the detecting means is controlled in accordance with the movement of the platen so that the various functions of the over-all machine are properly coordinated. It is apparent that any suitable operating means may be employed for causing actuation of valve 88 at the desired time.

It will be noted, as seen in FIGURE 2, that operation of the cylinder 84 will cause movement of slidable member 70 to the right as seen in this figure. A tension spring 106 has the opposite ends thereof connected with a first screw member 110 fixed to slidable member 70 and a second screw member 108 fixed to the support member 50 secured to the frame. It is apparent that spring 106 will normally tend to cause slidable member 70 to move to the left, as seen in FIGURE 2, whereby upon release of fluid pressure in cylinder 84 the reciprocating means will be moved back to the left.

A bracket member 110 includes a generally horizontally disposed leg portion 110' and a generally vertically disposed leg portion 110", this latter leg portion having a plurality of elongated slots 112 formed therethrough. The leg portion 70" of the slidable member is provided with a plurality of elongated slots 114 which may extend substantially perpendicular to slots 112. Member 110 is secured to member 70 by means of nut and bolt assemblies 116 extending through the slots 112 and slots 114, it being evident that the provision of the elongated slots 112 and 114 permits adjustment of member 110 into various desired positions. As seen in FIGURE 1, a plurality of spacer members 118 can be disposed at either side of the vertically extending wall portion 70" of member 70, and the bolts of the nut and bolt assemblies 116 extend through suitable holes provided in these spacer members. These spacer members further permit the bracket member 110 to be adjusted with respect to member 70 so as to permit accurate alignment of the detecting means so that it will properly enter into the open end of a container.

A slide block 126 is suitably secured to the upper surface of the bracket member 110 and is provided with a bore 128 formed therethrough which serves to slidably support an elongated detecting member 130 having a longitudinally extending bore 132 formed therethrough. Detecting member 130 includes an elongated portion 134 of reduced dimension which is slidably supported within a bore provided in a slide bearing 136 which is also suitably secured to the upper surface of bracket member 110. The bore formed through the detecting member opens through the rear portion 138 of this member and is in communication with a conduit 140 which is connected with a valve means 142 which is in turn connected with a conduit 144 which may be operatively associated with a suitable source of fluid pressure.

A member 150 is fixed to detecting member 130 and extends laterally therefrom. A compression spring 152 is disposed about the reduced portion 134 of the detecting member and lies between member 150 and slide bearing 136. It is apparent that this spring means will normally urge the detecting member into the position shown in FIGURE 1 wherein the member 150 is disposed in abutting relationship with member 126.

Member 150 is adapted to engage the actuating plunger 154 of valve means 142. When this actuating plunger is moved into the valve means as seen in FIGURE 2, the valve is actuated so as to provide fluid pressure within the elongated detecting member to be ejected through the open end of the detecting member as hereinafter described.

Referring now particularly to FIGURE 2 of the drawings, the ejecting means of the present invention includes a clamp member 160 which is clamped on guide rod 58 and which supports a member 162. A pair of spaced link members 164 are pivotally interconnected with the upper end of member 162 by a pivot pin 165, an angle member 166 being fixed to the outer ends of link members 164 and including a generally horizontally disposed leg portion 166' and a generally vertically disposed leg portion 166" in the initial operative position as seen in FIGURE 2.

Member 166 is pivotally interconnected through the intermediary of a pivot pin 170 with a piston rod 172 which is connected with a suitable piston provided within the cylinder 174 which is of the fluid operated type. A single-acting, spring returned cylinder 174 is pivotally interconnected with the lower bifurcated end member 162 by means of a pivot pin 175.

Conduit 176 is operatively connected with cylinder 174 and is also connected with valve means 142 whereby operation of the valve means 142 is adapted to cause actuation of the ejecting means as hereinafter described.

Operation

In operation, the conveying means will be properly indexed by suitable driving mechanism of the character described in the aforementioned application so as to move the right-hand container C into the position shown in FIGURE 1 wherein the neck portion thereof is supported by the guide means 40, and the closed end portion of the container is supported upon member 166 of the ejecting means.

When the conveying means has come to rest, certain other components of the machine may be actuated, and the cam means 104 or other operating means is adapted to actuate valve 88 so as to permit fluid pressure from supply line 90 to enter cylinder 84 through line 86 so as to move the piston therein and the slidable member 70 to the right, as seen in FIGURE 2. This causes the elongated detecting member 130 to enter within the open end of the adjacent container. The stroke or movement of the slidable member 70 is sufficient to ordinarily cause member 130 to be extended a substantial distance within the container. However, if member 130 should strike an obstructing portion within the interior of the container, its movement will be arrested because the end wall (bottom) of the container is in engagement with the wall 166" of member 166. The slidable member 70 and the associated portions such as members 126, 136 and 142 will, however, continue to move toward the container. This relative movement causes slide bearing 126 to have relative movement with respect to detecting member 130.

As the slidable member 70 continues to move toward the container, member 150 which is fixed to the arrested detecting member 130 will cause the still forwardly continuing, spring returned actuating plunger 154 of the valve 142 to be moved into its associated housing to thereby actuate valve 142.

Upon actuation of valve 142, fluid under pressure will pass through conduit 140 from the valve 88 and thence through the central bore 132 extending longitudinally through detecting member 130 so that a blast of fluid such as air under pressure is issued through the open end of member 130 into the interior of the container and produces a force urging the container to the right as seen in FIGURE 2. The plunger 88a of valve 88 is held inwardly by cam 96 for an interval of time permitting completion of the ejection and thence is returned by spring 88b when spring 106 returns the piston in cylinder 84.

Simultaneously with the introduction of fluid under pressure to the container, air or a like fluid under pressure also passes through conduit means 176 to the cylinder 174 so as to cause the piston therein and the associated piston rod to move upwardly as seen in FIGURE 2, whereby member 166 is caused to sharply pivot through a substantial quarter revolution to the right as seen in FIGURE 2. The cooperative action of the fluid jet directed into the container and impinging on the end (bottom) wall thereof, and the movement of member 166, causes the container to be ejected sharply to the right as seen in FIGURE 2, whereby a faulty container having an undesired obstruction within the open end portion thereof is quickly and efficiently ejected from the machine. The air jet is effective to remove the container endwise from guides 42 and 44 as soon as the right end of the container has been kicked upwardly by the member 166 sufficiently so that it clears the barrier portion 166", whereupon the air jet and member 166 cooperate to move the container sharply in an endwise direction to the right.

After an interval of time permitting completion of the ejecting action, if the container is faulty, the valve stem 88a will be returned to its original position by spring 88b, which will permit spring 106 to return slidable member 70 to its initial position. The air from cylinder 84 is free to exhaust through detector member 130. When slidable member 70 moves back to its original position, plunger 154 is permitted outward movement under the influence of return spring 142a so as to return the valve stem 142b of valve means 142 to its original position, whereupon the supply of fluid from line 144 will be cut off from conduits 140 and 176. This accordingly interrupts the flow of air or the like through the bore 132 in the detecting member 130 and causes the ejecting means including member 166 to return to its initial position as seen in FIGURE 2. The air from cylinder 174 can exhaust through member 132. The automatic container checker and ejector apparatus is then in position to repeat the complete cycle and move the next container on the conveying means into position to be checked and either accepted or rejected, as the case may be.

It is apparent from the foregoing that there is provided according to the present invention new and novel automatic container checker and ejector apparatus which is especially adapted for checking whether there are obstructing portions in the neck of a container formed of plastic and the like. The apparatus includes means for automatically ejecting a container if undesired obstructions are present therewithin. The apparatus is adapted for use in an indexing type machine in the fabrication line, and the apparatus is quite simple and inexpensive in construction, yet is efficient, fast-acting and reliable in operation.

As this invention may be embodied in several forms without departing from the spirit or essential characteristics thereof, the present embodiment is thereby illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:
1. Automatic container checker and ejector apparatus comprising support means for supporting a container in operative position, detecting means movably mounted for movement toward and away from said container, fluid pressure means operatively associated with said detecting means for providing fluid under pressure at one end portion of a container to urge the container away from said detecting means, and ejecting means adapted to engage the opposite end of a container and operable in conjunction with said fluid pressure means to eject a container from the apparatus.

2. Automatic container checker and ejector apparatus comprising support means for supporting a container in operative position, detecting means including an elongated member, said member having a bore extending longitudinally therethrough, means supporting said elongated member for reciprocation toward and away from the open end of a container to be checked, means for providing fluid pressure through said bore in the detecting member, valve means for controlling the flow of fluid pressure through said detecting member, means connected with said detecting member for actuating said valve means upon predetermined movement of said detecting member, ejecting means including a portion adapted to engage the opposite end of a container, fluid pressure operated means operatively connected with said ejecting means for operating the ejecting means, said valve means also being operatively connected with said fluid pressure operating means for controlling the operation thereof such that fluid pressure is ejected through the bore in said detecting member substantially simultaneously with operation of said ejecting means.

3. Automatic container checker and ejector apparatus comprising support means for supporting a container in operative position, detecting means including an elongated member having a bore formed longitudinally therethrough, said elongated member being mounted upon reciprocating means which is adapted to move toward and away from the open end of a container to be checked, said elongated member being slidable with respect to said reciprocating means, resilient means normally urging said elongated member into one limit of movement and permitting movement of the elongated member away from said limit of movement when it contacts an obstruction within a container, means for providing fluid pressure to the bore in said elongated member for ejecting fluid pressure therefrom into the interior of a container to be checked, valve means mounted on said reciprocating means and adapted to control the flow of fluid pressure through said detecting member, means fixed to said detecting member for actuating said valve means upon relative movement between said detecting member and said reciprocating means, ejecting means including a portion adapted to engage the opposite end of a container, said ejecting means portion being mounted for pivotal movement, fluid pressure operated means operatively connected with said ejectingg means portion to cause pivotal movement thereof when actuated, means for providing fluid pressure to said fluid pressure operated means, said valve means also controlling the flow of fluid pressure to said fluid operated means whereby upon actuation of said valve means, fluid pressure is ejected through the bore in said detecting member into the interior of the container, and said fluid pressure operated means is operated to cause pivotal movement of said ejecting means portion whereby a container is ejected from the apparatus.

4. Container checking and ejecting apparatus comprising: support means for a container lying on its side and having an open neck portion, said support means including a container end abutting portion for normally preventing endwise displacement of the container in one direction movable to a position in which it does not prevent endwise displacement in said direction; obstruction detecting means having relative endwise movement with said neck portion; and means responsive to said detecting means for ejecting said container outwardly from said support means in a generally endwise direction when an obstruction is encountered by said detecting means.

5. The combination defined in claim 4 in which said support means includes an angle member with a vertical wall comprising said end abutting portion; means pivotally mounting said angle member; and said responsive means includes power means connected with said angle member and operative to sharply pivot said angle member upwardly and outwardly.

6. The combination defined in claim 4 in which said detecting means comprises a hollow plug member; and said responsive means includes means for introducing a jet of fluid under pressure axially into the container through said plug member.

7. Container checking and ejecting apparatus comprising: support means for a container having an open neck portion; a container end abutting portion for normally preventing endwise displacement of the container in one direction; obstruction detecting means adjacent said neck portion and having relative endwise movement therewith; and means responsive to said detecting means for displacing said end abutting portion and permitting endwise displacement of said container when an obstruction is encountered by said detecting means.

8. Container checking and ejecting apparatus comprising: support means for a container having an open neck portion; tubular obstruction detecting means having relative endwise movement with said neck portion; and means responsive to said detecting means for introducing a jet of fluid under pressure therethrough and ejecting said container generally endwisely when an obstruction is encountered by said detecting means.

9. A method of checking and ejecting a plastic container having an open neck portion comprising: moving said container and a detector adjacent the neck portion relatively endwisely; and introducing air or a like fluid under pressure through said neck portion in a jet stream which impinges on the opposite end wall of the otherwise closed container when an obstruction is encountered by the detector to eject said container.

10. A method of checking and ejecting a plastic container having an open neck portion comprising: moving said container and a detector adjacent the neck portion relatively endwisely at a detection station; and introducing air or a like fluid under pressure through said neck portion in a jet stream which impinges on the opposite end wall of the container when an obstruction is encountered by the detector, while substantially simultaneously pivoting the said opposite end wall of the container upwardly and in an endwise direction to eject said container from the station.

11. A method of checking and ejecting a plastic container having an open neck portion comprising: moving said container and a detector adjacent the neck portion relatively endwisely at a detection station while preventing movement of said container in an endwise direction; and introducing air or a like fluid under pressure through said neck portion in a jet stream which impinges on the opposite end wall of the otherwise closed container when and obstruction is encountered by the detector, while freeing said container for movement generally in said direction.

References Cited

UNITED STATES PATENTS

| | | | |
|---|---|---|---|
| 2,407,062 | 9/1946 | Darrah | 209—74 |
| 2,759,600 | 8/1956 | Saylor | 209—83 |
| 3,250,388 | 5/1966 | Eggers | 209—82 |

M. HENSON WOOD, Jr., *Primary Examiner.*

R. A. SCHACHER, *Assistant Examiner.*